United States Patent [19]
Gelfand

[11] Patent Number: 4,694,436
[45] Date of Patent: Sep. 15, 1987

[54] NOISE-ATTENUATING STREAMER-CABLE BULKHEAD

[75] Inventor: Valery A. Gelfand, Houston, Tex.

[73] Assignee: Western Geophysical Company of America, Houston, Tex.

[21] Appl. No.: 615,086

[22] Filed: May 29, 1984

[51] Int. Cl.$^4$ .............................................. G01V 1/38
[52] U.S. Cl. .................... 367/20; 174/99 R; 174/101.5
[58] Field of Search ............ 174/28, 99 R, 111, 101.5; 367/20, 153, 154, 176, 165; 181/110, 112; 333/244

[56] References Cited

U.S. PATENT DOCUMENTS

| | | | |
|---|---|---|---|
| 3,660,809 | 5/1972 | Pearson | 367/165 |
| 3,801,725 | 4/1974 | Farish | 174/28 |
| 3,885,286 | 5/1975 | Hill | 29/745 |
| 3,893,063 | 7/1975 | Park et al. | 367/154 |
| 3,985,948 | 10/1976 | Olszewski et al. | 174/28 |
| 4,296,481 | 10/1981 | Weiss | 367/20 |
| 4,477,887 | 10/1984 | Berni | 181/110 |

Primary Examiner—Thomas H. Tarcza
Assistant Examiner—Ian J. Lobo
Attorney, Agent, or Firm—William A. Knox; E. Eugene Thigpen; Barry C. Kane

[57] ABSTRACT

A plurality of streamer-cable bulkheads mounted within a streamer cable in cascade for radially scattering tube-wave noise from a streamer-cable. Each bulkhead consists of an annular body with conical surfaces converging at a desired angle, extending outwards from both ends of the annular body. An axial hole and a plurality of off-axial holes extending through the bulkhead for receiving therethrough, electrical conductors and stress members respectively. Noise traveling within the tube in a waveguide mode, impinges upon the conical surfaces of the cascaded bulkheads, and is reflected out of the streamer-cable jacket.

7 Claims, 5 Drawing Figures

NOISE-ATTENUATING STREAMER-CABLE BULKHEAD

BACKGROUND OF THE INVENTION

1. Field of the Invention

This invention relates to marine seismic streamer-cables and more particularly to cable-noise attenuation.

2. Description of the Prior Art

A seismic streamer-cable consists of a water-tight tubular plastic jacket containing a plurality of hydrophones, depth transducers, and electrical conductors extending through a series of bulkheads or spacers. The bulkheads are interconnected by steel strain members. The strain members prevent the plastic jacket from stretching while in tow. Streamer-cable bulkheads serve to protect the enclosed hydrophones and electrical conductors, prevent entanglement of the stress members, and maintain a cylindrical profile of the plastic jacket. The jacket is filled with a non-corrosive, non-conductive cable oil such as light kerosene to provide neutral bouyancy. For a description of the method and apparatus for seismic cable assembly, see U.S. Pat. No. 4,296,481 by Weiss and U.S. Pat. No. 3,885,286 by Hill.

In marine seismic exploration, movement of the streamer-cable through the water may generate noise on the order of 5 to 10 $\mu\mu V$ or more. Two mechanisms are believed to cause much of the noise, which propagates within the jacket in a waveguide mode. Hereinafter, noise traveling within the jacket in a waveguide mode will be referred as tube-wave noise.

In the first mechanism, tube-wave noise is initiated by some sound-generating source outside the jacket (a boat, streamer-cable binding causing turbulence, etc.). The resulting wave front initiates a second wave front inside the cable. The latter wave front reflects off the boundary between the cable oil and the surrounding water (the plastic jacket can be ignored) at an angle less than or equal to the critical angle, propagating within the streamer-cable as tube-wave noise almost without attenuation.

A second mechanism may occur when the strain members are subjected to tensional variations, causing axial translation of the bulkheads within the plastic tube. That movement generates compressional acoustic waves that propagate through the cable oil. Both mechanisms occur when the velocity of sound in the cable oil is less than the velocity of sound in the external medium, that is, the water.

SUMMARY OF THE INVENTION

It is an object of this invention to reduce the noise level due to tube waves propagating through the cable oil and trapped in the streamer-cable jacket which is acting as a waveguide.

The invention consists of a plurality of cylindrical bulkheads with converging bi-conical surfaces, tapered at a desired angle, and extending outwardly from both ends of the cylindrical portion of the bulkhead. The vertices of the cones define an axis that is parallel with the longitudinal axis of the jacket. Cable noise propagating through the jacket in a tube-wave mode, is partially reflected outwards, perpendicular to the longitudinal jacket axis by the conical surfaces of the bulkheads, thus reducing the tube-wave noise level. The sequence of hundreds of the bi-conical bulkheads within a streamer-cable section acts as a cascaded mechanical filter for radially scattering tube-wave noise.

BRIEF DESCRIPTION OF THE DRAWINGS

A better understanding of the benefits and advantages of my invention may be obtained from the appended detailed description and the drawings, wherein.

DETAILED DESCRIPTION OF THE PREFERRED EMBODIMENT

Figure 1:
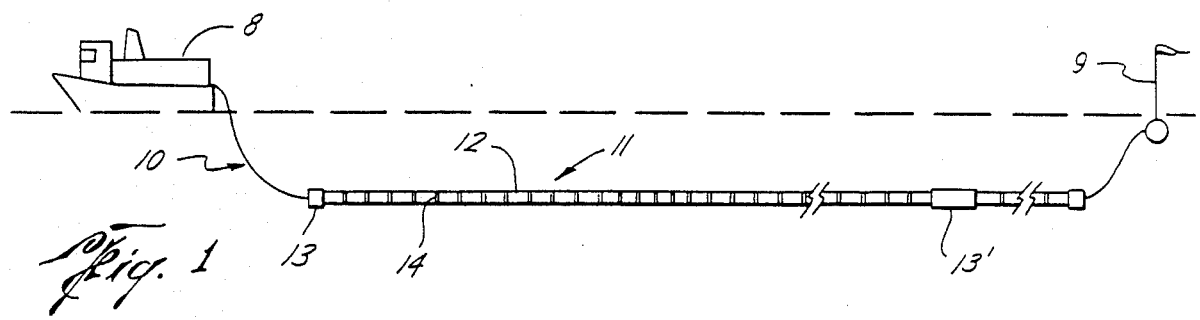
FIG. 1 illustrates a streamer-cable consisting of many cable sections.
Figure 2:
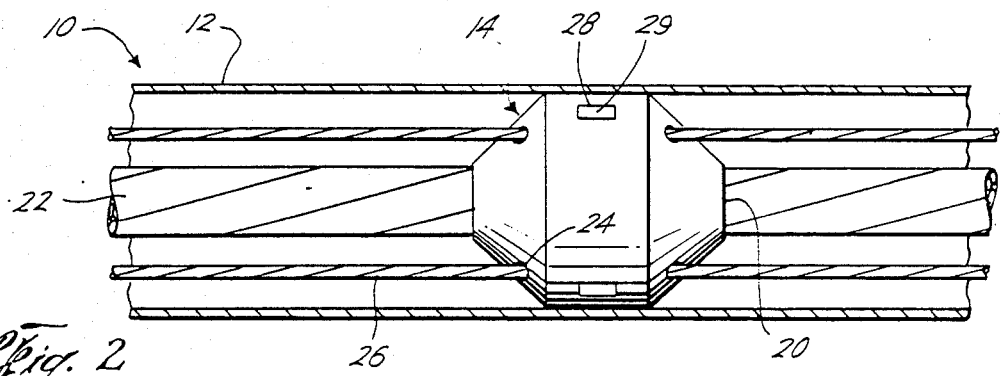
FIG. 2 illustrates a cross-sectional view of a portion of a seismic streamer-cable embodying the invention.

Referring to FIGS. 1 and 2, a seismic vessel 8 is shown towing a streamer-cable 10 and tail-buoy 9. Streamer-cable 10 consists of many cable sections such as 11, mechanically coupled by cable connectors such as 13, 13'. Each cable section may be up to several hundred feet long, consisting of an outer plastic tubular jacket 12, enclosing one hundred or more bi-conical bulkheads such as 14.

FIG. 2 more clearly illustrates a portion of a streamer-cable 10 consisting of an outer plastic jacket 12 enclosing bi-conical bulkhead 14. Through axial hole 20 passes electrical conductor bundle 22. Electrical conductor bundle 22 connects hydrophones and depth transducers to a signal procesing device on a vessel. Through symmetrically-spaced off-axial holes, such as 24, extend steel stress members as indicated by 26. The stress members are anchored to bulkhead 14 is radially spaced windows such as 28 by solder balls 29. This structrue is repeated along the length of the streamer at one- to three-foot intervals. Since a typical cable may be 8,000 to 10,000 feet long, several thousand such bulkheads are mounted within the cable. Suitable cable connectors 13, 13' well known to the art for making mechanical and electrical connections between cable sections are coupled at each end of jacket 12 by stress members such as 26 to prevent stretching of the streamer-cable.

Figure 3:
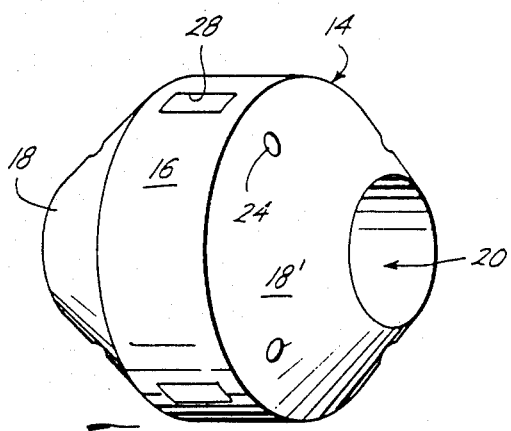
FIG. 3 is an oblique view of the bi-conical bulkhead of this invention.

FIG. 3 is an oblique view of bi-conical bulkhead 14, consisting of a cylindrical portion 16, each end of which converges inwardly to form frusto-conical surfaces 18, 18'. Axial hole 20 extends through bulkhead 14 to receive electrical conductor bundle 22 previously described. A typical bulkhead is made from a plastic such as a poly-carbonate resin.

Figure 4:
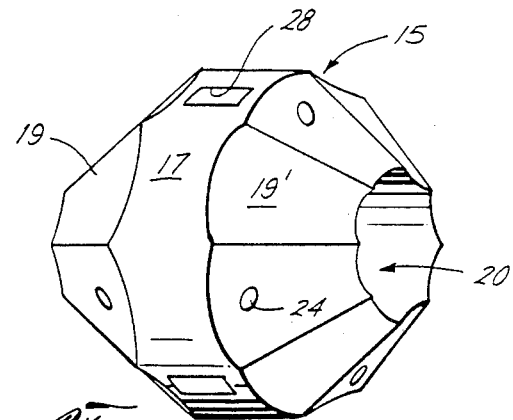
FIG. 4 is an oblique view of a multi-faceted bi-pyramidal bulkhead also embodied in this invention.

FIG. 4 illustrates an oblique view of a multi-faceted by-pyramidal bulkhead 15, consisting of a cylindrical portion 17 each end of which converges inwardly to form frusto-pyramidal surfaces 19, 19'. Axial hole 20 and off-axial holes such as 24 are arranged as previously described.

Figure 5:
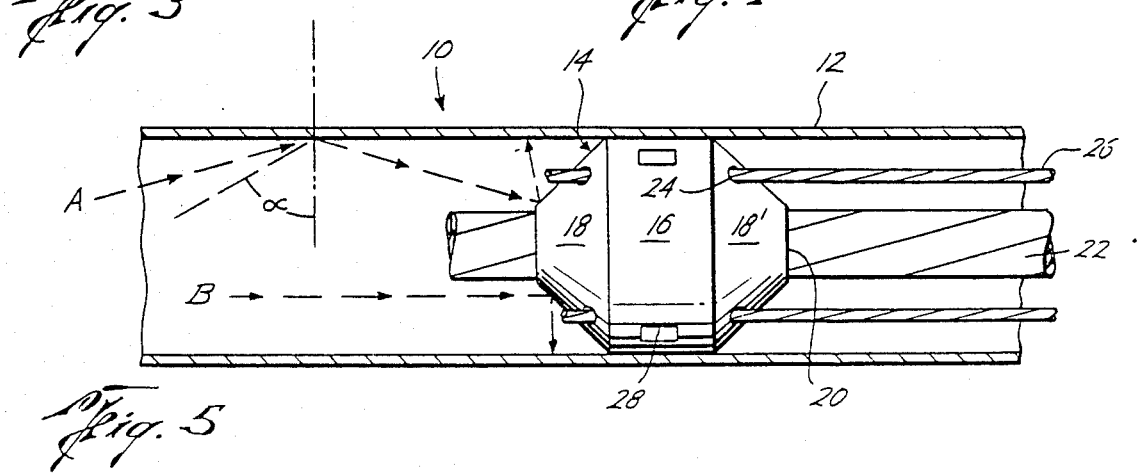
FIG. 5 illustrates the manner in which tube-wave noise is reflected out of the cable by the bi-conical bulkhead.

FIG. 5 illustrates the method in which tube-wave noise is reduced by this invention: Rays A and B represent hypothetical ray paths followed by noise waves. Ray A incident upon jacket 12 (oil-water interface) outside the critical angle of reflection $\alpha$ is totally reflected and continues to propagate within jacket 12. Ray B is not reflected but follows a direct travel path.

Incident upon bulkhead 14, both rays A and B are directly reflected outwardly from the surfaces 18, 18' of bulkhead 14 which slope at a desired substantial angle of substantially 45° relative to the longitudinal axis, along ray paths substantially perpendicular to the longitudinal axis of streamer-cable 10, normal to jacket 12 within the critical angle $\alpha$.

As previously pointed out, each cable section includes a plurality of bulkheads. Those skilled in the art will recognize that no single bulkhead will entirely eliminate all of the tube-wave noise generated within the interval between adjacent bulkheads. Some of the noise will pass through a bulkhead. But a plurality of bulkheads arranged in cascade will act as a multi-element, mechanical noise-blocking filter, each bulkhead scattering some of the tube-wave energy. The frusto-conical portions of the bulkheads may be smoothly circular, or the frusto-conical portion may be quasi-conical and randomly faceted as shown in FIG. 4. The purpose of such shapes is to insure that there is no preferred ray-path direction for the scattered noise to follow. The only requirement is that the tube-wave noise be scattered in a direction substantially perpendicular to the longitudinal axis of the streamer-cable section. That requirement is necessary so that the noise will not be reflected or refracted back into the cable jacket.

For illustrative purposes, my invention has been described with a certain degree of specificity. Variations will occur to those skilled in the art but which may be included within the scope and spirit of this invention which is limited only by the appended claims.

I claim as my invention:

1. A noise-scattering structure for use with a streamer-cable section, said section including a flexible plastic jacket, connecting means at each end of said jacket for making electrical and mechanical connections with other sections, stress members within said jacket interconnecting said end coupling means, and electrical components inside said jacket for receiving and transmitting seismic signals to a signal processor, comprising:
   a plurality of bulkheads coupled to cascade to said stress members at regular intervals;
   said plurality of bulkheads having means for radially scattering tube-wave noise from said streamer cable section, comprising: a cylindrical body; multi-faceted surfaces converging at a desired angle of substantially 45°, extending outwards from both ends of said cylindrical body; said bulkhead having an axial hole truncating the vertices of said multi-faceted surfaces for receiving electrical components therethrough; and means for anchoring said stress member to said bulkhead.

2. A noise-scattering structure for use with a streamer-cable section, said section including a flexible plastic jacket, connecting means at each end of said jacket for making electrical and mechanical connections with other sections, stress members within said jacket interconnecting said end coupling means, and electrical components inside said jacket for receiving and transmitting seismic signals to a signal processor, comprising:
   a plurality of bulkheads coupled in cascade to said stress members at regular intervals;
   said plurality of bulkheads having means for radially scattering tube-wave noise from said streamer cable section comprising:
   a cylindrical body; and frusto-conical surfaces converging at a desired angle of substantially 45° extending outwards from both ends of said cylindrical body.

3. In a seismic marine streamer cable section having an outer jacket, a noise blocking filter comprising:
   a plurality of bulkheads mounted in cascade within said jacket disposed at desired intervals along said section;
   said bulkheads having end surfaces adapted to reflect tube-wave noise for radially scattering tube-wave noise, said surfaces having a quasi-conical randomly faceted shape.

4. In a seismic marine streamer cable section having a longitudinal axis and an outer jacket, a noise-blocking filter comprising:
   a plurality of bulkheads having outer surfaces sloping at an angle of substantially 45° from said longitudinal axis and from the perpendicular thereto.

5. A streamer cable section adapted for reducing tube-wave noise within said cable when said cable is deployed in a body of water comprising:
   a flexible tubular oil-filled external jacket; and
   a plurality of bulkheads within said tubular jacket having end surfaces adapted to reflect tube-wave noise so as to radially scatter the noise,
   said end surfaces having a slope relative to the longitudinal axis of said external jacket so that noise traveling through the tube in a direction so as not to be incident on the internal surface of the external jacket at an angle within the critical angle of the oil-water interface will be reflected from the end surface of a bulkhead at an angle so as to be incident on the internal surface of the external jacket at an angle within said critical angle.

6. The apparatus of claim 5 wherein said end surfaces are substantially frustoconical.

7. A streamer cable section adapted for reducing tube-wave noise within said cable when said cable is deployed in a body of water comprising:
   a flexible tubular oil-filled external jacket; and
   a plurality of bulkheads within said tubular jacket having end surfaces adapted to reflect tube-wave noise so as to radially scatter the noise,
   and said end surfaces are multifaceted substantailly pyramidal surfaces having a slope relative to the longitudinal axis of said external jacket so that noise traveling through the tube in a direction so as not to be incident on the internal surface of the external jacket at an angle within the critical angle of the oil-water interface will be reflected from the end surface of a bulkhead at an angle so as to be incident on the internal surface of the external jacket at an angle within said critical angle.

* * * * *